Figure 1:
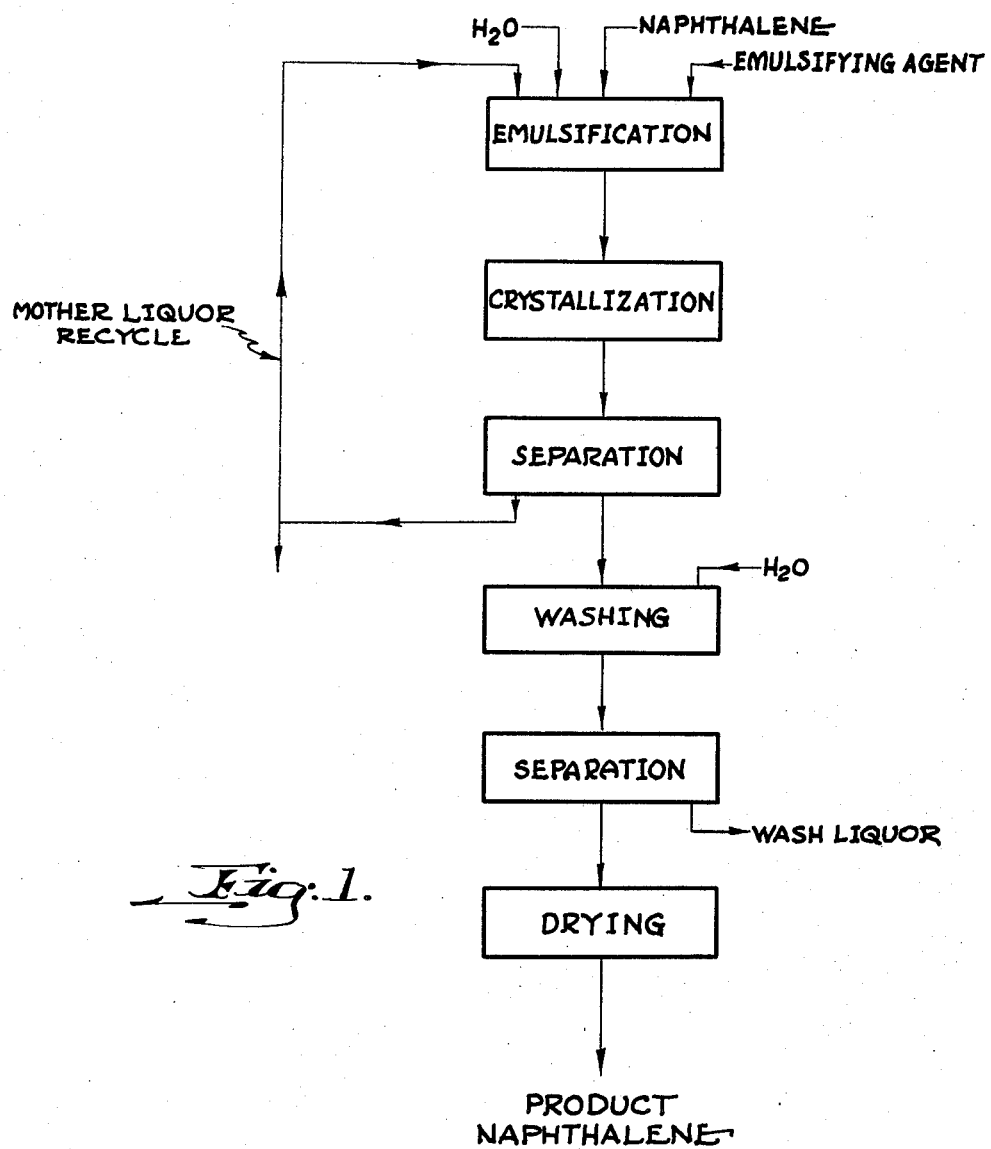

United States Patent Office 2,890,254
Patented June 9, 1959

2,890,254
PURIFICATION OF NAPHTHALENE

Robert Sherman Detrick and George G. Lauer, Pittsburgh, Pa., assignors to Koppers Company, Inc., a corporation of Delaware Application July 2, 1954, Serial No. 441,122

25 Claims. (Cl. 260—674)

This invention relates in general to the purification of naphthalene. More particularly this invention also relates to a process for the purification of naphthalene by crystallization wherein naphthalene is emulsified in a mother liquor obtained from previous crystallizations of impure naphthalene, which mother liquor contains constituents derived from said impure naphthalene, and naphthalene of improved purity is thereafter separated from the mother liquor.

Purification of impure naphthalene by emulsion crystallization has presented numerous problems in the past. A major problem that has arisen with this process has concerned the presence of phenols in the aqueous phase of the effluent resulting from this process. This effluent is often disposed of by simply being passed to a river, stream, etc., or by other suitable means. The phenols present in the waste effluent have consequently contaminated the rivers, streams, etc., resulting in harmful and occasionally fatal effects to the aquatic fauna and flora inhabiting the rivers and streams due to the toxicity of these phenols. Domestic and industrial water supplies are also endangered and often even contaminated by this waste effluent. In recent years anti-pollution committees and organizations have been set up and legislation has been enacted in many sections of the country to obviate this problem. Consequently this waste effluent containing these toxic phenols must be dephenolized which involves great expense, and therefore the amount of waste effluent from the process which is subjected to dephenolization should be held to a minimum.

Another problem that has arisen in connection with this process has been concerned with the considerable expense involved due to the fact that the emulsifying agents employed in the process have been discarded after each run. Additionally the relatively large quantities of water used, both in the emulsification of the crude and in washing the crystallization product, have been discarded after each run. It has been the general consensus that the emulsifying agent and water could not be recycled and reused in succeeding runs of the process on the basis that the increased impurities content of the recycled mother liquor would not permit efficient extraction of impurities from the naphthalene, and therefore the purity of the product naphthalene would not be substantially increased.

It is therefore an object of the present invention to provide a process for the purification of impure naphthalene by crystallization whereby the naphthalene can be emulsified in a mother liquor containing constituents associated with an impure naphthalene concentrated therein and at the same time to make separable from said mother liquor a product naphthalene of a preferred freezing point.

Another object of the invention is to provide a process whereby a purified naphthalene of a preferred freezing point can be recovered from the process with a minimum production of mother liquor and wash liquor.

An additional object is to provide a process for the purification of impure naphthalene by crystallization which is highly advantageous from an economic standpoint.

A further object is to provide a process for the emulsion purification of impure naphthalene which will obviate the contamination and pollution of streams, lakes, rivers, etc., and domestic and industrial water sources with phenolic and other toxic and undesirable materials.

Ancillary and additional objects and advantages, if not specifically set forth herein, will be readily apparent to one skilled in the art from the following detailed description of the invention.

It has now been found that a purified naphthalene of a preferred freezing point is obtained by emulsifying at a temperature of at least about the freezing point of the impure naphthalene to be treated and advantageously at about 85° C., impure liquid naphthalene in mother liquor recovered from previous aqueous emulsion treatment of impure naphthalene, which mother liquor contains constituents derived from said impure naphthalene such as neutral, aromatic hydrocarbon oils, phenols, unsaturated compounds, and pyridine bases, water, naphthalene and a small amount of an emulsifying agent of the group consisting of anionic and cationic surface active agents; lowering the temperature of the emulsion to crystallize the naphthalene while the impurities remain dispersed in the mother liquor; separating the product to give a purified crystalline naphthalene and an impurities-containing mother liquor; and thereafter recycling said mother liquor to the aforesaid step of emulsifying newly-incoming impure naphthalene therein. If it is deemed necessary or desirable, an emulsifying agent and water can be added to the mother liquor either before or after mixing with additional impure naphthalene to make up for any handling losses of emulsifying agent and water that may have occurred and to increase the stability and degree of dispersion of the impurities in the water. The process of this invention can be operated in either a batchwise or continuous manner.

The water which is utilized in the emulsification step and which can be utilized in the hereinafter-described washing operation, if desired or required, is advantageously water which has been purified by, for example, distillation, or by treatment with ion exchange resins, zeolite, etc.; although hard water or tap water, etc., can be employed, if desired, with no serious effects on the purity of the product naphthalene.

Excellent results are obtained by carrying out the emulsification at a naphthalene-water weight ratio of from about 1:1 to about 1:2. This is true regardless of whether the water is newly added or is water present in recycled mother liquor, water separated from "broken" mother liquor emulsions, wash liquor, or mixtures thereof. A naphthalene-water weight ratio substantially greater than 1:2 and less than 1:1 can be employed, if desired, and will result in a naphthalene of improved purity. Good results are obtained when the amount of emulsifying agent utilized in this invention is at least about 0.2% by weight based on the weight of the naphthalene treated. Particularly good results are obtained by utilizing from about 1% to about 2% by weight of emulsifying agent based on the weight of the naphthalene. More than 2% by weight of emulsifying agent can be employed in this invention, if desired, and even less than 0.2% by weight will result in a product naphthalene of improved purity.

Any suitable means can be utilized for cooling or adjusting the temperature of the emulsion to crystallize out the naphthalene. In the laboratory, stirring by means of, for example, a high speed marine-type propeller wherein the emulsion is cooled by the natural convection and conduction to the room has been found to be an advantageous method of cooling the emulsion. However, cooling by means of a fan or simply by air cooling while stirring can be employed, if desired. On a plant scale, the emulsion can be cooled by being circulated through any suitable heat exchanger wherein the turbulence of the emulsion is sufficient to prevent deposition of the crystals on the cooling surface. It has been found advantageous to cool the emulsion gradually over a period of at least about 30 minutes inasmuch as crystals of sufficient size to be separated are then produced. If the emulsion is cooled instantaneously or over a period substantially less than 30 minutes, the formed crystals are so minute and fine that it is difficult to separate them from the mother liquor.

The purified naphthalene, after it is separated from the impurities-containing mother liquor, is advantageously washed. This washing may be accomplished by slurry washing wherein the separated naphthalene cake is repulped in water or by washing the separated naphthalene on the filter or the centrifuge. It is to be understood that washing is not essential where a small amount of emulsifying agent or other material is not harmful to the product naphthalene. When it is advantageous to wash the purified naphthalene, the washing is carried out in a single washing operation in one embodiment of this invention and in a first and second washing operation in other embodiments of this invention. Each washing operation is advantageously carried out by slurry washing or by washing the purified naphthalene on the filter or centrifuge. The resultant slurry is then separated by any suitable method such as by filtering with, for example, a Buchner funnel, a filter press of the plate and frame type, a drum type continuous filter, etc., wherein any suitable filter media such as, for example, cloth filter media, filter paper, porous media, etc., can be employed; or by centrifuging with a batch centrifuge or a continuous centrifuge in plant operations. This washing is advantageously carried out in a similar manner at least a second time in each washing operation, and the resulting slurry separated as before by filtration or centrifuging.

The wet, purified naphthalene can be dried advantageously by distillation or by decantation although, if desired, other suitable drying means such as, for example, oven drying or vacuum drying can be employed. When distillation is the method employed, the wet naphthalene is placed into a suitable still and distilled to a head temperature of advantageously about 214° C. When decantation is employed, sodium sulfate can be advantageously added to the wash water, if desired, in small increments until the sodium sulfate content of the water phase is from about 1% to about 2% by weight based on the weight of water so as to provide adequate gravity differential resulting in a decanted naphthalene containing less than 1% by weight of water. Decantation is particularly advantageous for large scale plant operations.

The invention may be more thoroughly understood by reference to the accompanying drawings in which Figures 1 through 5 illustrate various embodiments of the invention.

Percentages given herein are by weight unless otherwise specified.

In accordance with the procedure illustrated in Fig. 1, newly-incoming impure naphthalene is mixed at a temperature of at least about the freezing point of the newly-incoming impure naphthalene and advantageously at about 85° C. in recycled mother liquor recovered from previous treatment of impure naphthalene. Temperatures of emulsification as high as 100° C. produce good results. This recycled mother liquor contains constituents derived from the impure crude naphthalene as well as water and advantageously a small amount of an emulsifying agent such as, for example, an alkyl-aryl sulfonate of the type employed in many of the present-day detergent compositions, i.e., sodium dodecylbenzene sulfonate, sodium alkyl naphthalene sulfonates, etc., or an alkali metal salt of a higher fatty acid, such as, for example, sodium oleate. Small amounts of emulsifying agent, for example about 0.25% by weight based on the weight of the naphthalene treated, and water, for example about 5% by volume, are advantageously added to the recycled mother liquor to compensate for any handling loss of these materials which would include water adhering to the naphthalene crystals. The finally-adjusted weight ratio of impure naphthalene to water is advantageously about 1:2 and the amount of emulsifying agent present in the finally-adjusted mother liquor-naphthalene emulsion is advantageously about 1% by weight. The temperature of the emulsion is then lowered or adjusted to crystallize out the naphthalene while the impurities, including the phenolic materials, remain dispersed in the mother liquor. The temperature at which the naphthalene begins to crystallize will depend on the purity of the naphthalene with naphthalene of a higher degree of purity beginning to crystallize at a higher temperature than the more impure naphthalene. Good results have been obtained when the temperature of the emulsion is lowered to at least about 60° C. and excellent results have been obtained by lowering the temperature to from about 20° C. to about 40° C. The mixture of naphthalene crystals in mother liquor is then separated by filtration into a substantially purified crystalline fraction and an impurities-containing fraction of mother liquor. If a centrifuge is employed to separate the crystals from the mother liquor as distinguished from a filter, a small amount of the mother liquor is withdrawn from this fraction of mother liquor and water and emulsifying agent advantageously added thereto to maintain the proper weight balance in the system. Good results have been obtained when the amount withdrawn has been from about 3% to about 8.4% by volume but more than 8.4% and less than 3% could be withdrawn if desired. The mother liquor fraction is returned to the aforesaid emulsification step. The separated crystalline naphthalene fraction is then advantageously washed by the hereinbefore-described sole washing operation and thereafter separated from the wash liquor and dried by one of the previously described separation and drying methods.

The following specific example is illustrative of a typical procedure for the emulsion purification of impure naphthalene wherein impure naphthalene is emulsified in distilled water and crystallized therefrom.

EXAMPLE I 250 grams of liquid naphthalene having a freezing point of 74.6° C. is mixed with 500 ml. of distilled water. 2.5 grams of sodium oleate is mixed with this mixture of naphthalene and distilled water at a temperature of about 85° C. by means of a stainless steel stirrer having a three-blade marine-type propeller. Stirring is continued and the mixture is cooled to 10° C. over a period of 180 minutes and naphthalene allowed to crystallize therefrom. The flowable slurry is then passed to a Buchner funnel having a double-canvas disc as the filtering medium where the crystallized naphthalene is separated from the cooled mother liquor and washed with water. A produce naphthalene having a freezing point of 79.4° C is obtained.

Any emulsifying agent of the type disclosed herein can be utilized in place of the sodium oleate.

The following specific example is illustrative of a typical procedure according to the process illustrated in the flow sheet of Fig. 1.

EXAMPLE II

The emulsification, crystallization and separation steps of Example I are repeated utilizing 250 grams of liquid naphthalene having a freezing point of 74.6° C., 475 ml. of the mother liquor of Example I and 25 ml. of distilled water in the presence of 1.65 grams of sodium oleate. Crystallization is effected by cooling the emulsion to about 20° C. over a period of 150 minutes. The filter cake is repulped in 300 ml. of distilled water, and the slurry filtered by means of the Buchner funnel described above. This washing and separation is carried out again in an identical manner. The naphthalene is then dried by being placed in an Engler flask and distilled to a head temperature of 214° C. The small amount of naphthalene present in the distillate is separated therefrom and included in the yield after it is determined that do difference in quality exists between the naphthalene remaining in the distillation flask and the naphthalene in the receiver.

The foregoing procedure, which is referred to as the first recycle in the table of results hereinafter set forth, is repeated eight times using a new batch of the same weight of impure naphthalene each time, the seven repeated runs being referred to as the second recycle, third recycle, fourth, fifth, sixth, seventh, eighth and ninth recycle in the table. The run referred to in the following Table I as the initial run represents a run in which 1% by weight of sodium oleate based on the weight of the naphthalene was admixed with a 1:2 weight ratio of crude naphthalene and distilled water. Data directed to the products of the initial run and the nine recycle runs are presented in the following Table I for a starting material comprising a crude naphthalene having a freezing point of 74.6° C.

*Table I*

|   | Fresh Sodium Oleate, Wt. Percent Added | Product, F. Pt., ° C. | Yield Percent |
|---|---|---|---|
| Starting Material |   | 74.6 |   |
| Initial Run | 0.25 | 79.4 | 94.1 |
| First Recycle | 0.25 | 79.3 | 92.8 |
| Second Recycle | 0.25 | 79.1 | 93.2 |
| Third Recycle | 0.25 | 79.0 | 94.8 |
| Fourth Recycle | 0.25 | 78.9 | 94.1 |
| Fifth Recycle | 0.25 | 78.7 | 94.2 |
| Sixth Recycle | 0.25 | 78.7 | 94.6 |
| Seventh Recycle | 0.25 | 78.6 | 94.6 |
| Eighth Recycle | 0.25 | 78.7 | 94.6 |
| Ninth Recycle | 0.25 | 78.7 | 94.6 |

In the foregoing table of data and in the tables of data hereinafter described, the column entitled "Yield" designates the percentage of naphthalene in the product based on the content of naphthalene in the charge.

EXAMPLE III

A procedure similar to that of Example II is carried out utilizing 250 grams of liquid acid and base-free naphthalene having a freezing point of 52.1° C. in the weight ratio of 1:1.2 with a mixture of a mother liquor obtained from previous crystallizations of naphthalene (which originally contained 5 grams of "Surf") in the presence of .63 gram of "Surf." This emulsification is carried out at a temperature of 59° C. Stirring during the emulsification and cooling steps is accomplished by means of a marine-type two-blade propeller and the emulsion cooled to a temperature of 36° C. over a period of 33 minutes. A product naphthalene having a 78.5° C. freezing point is obtained.

Figure 2:
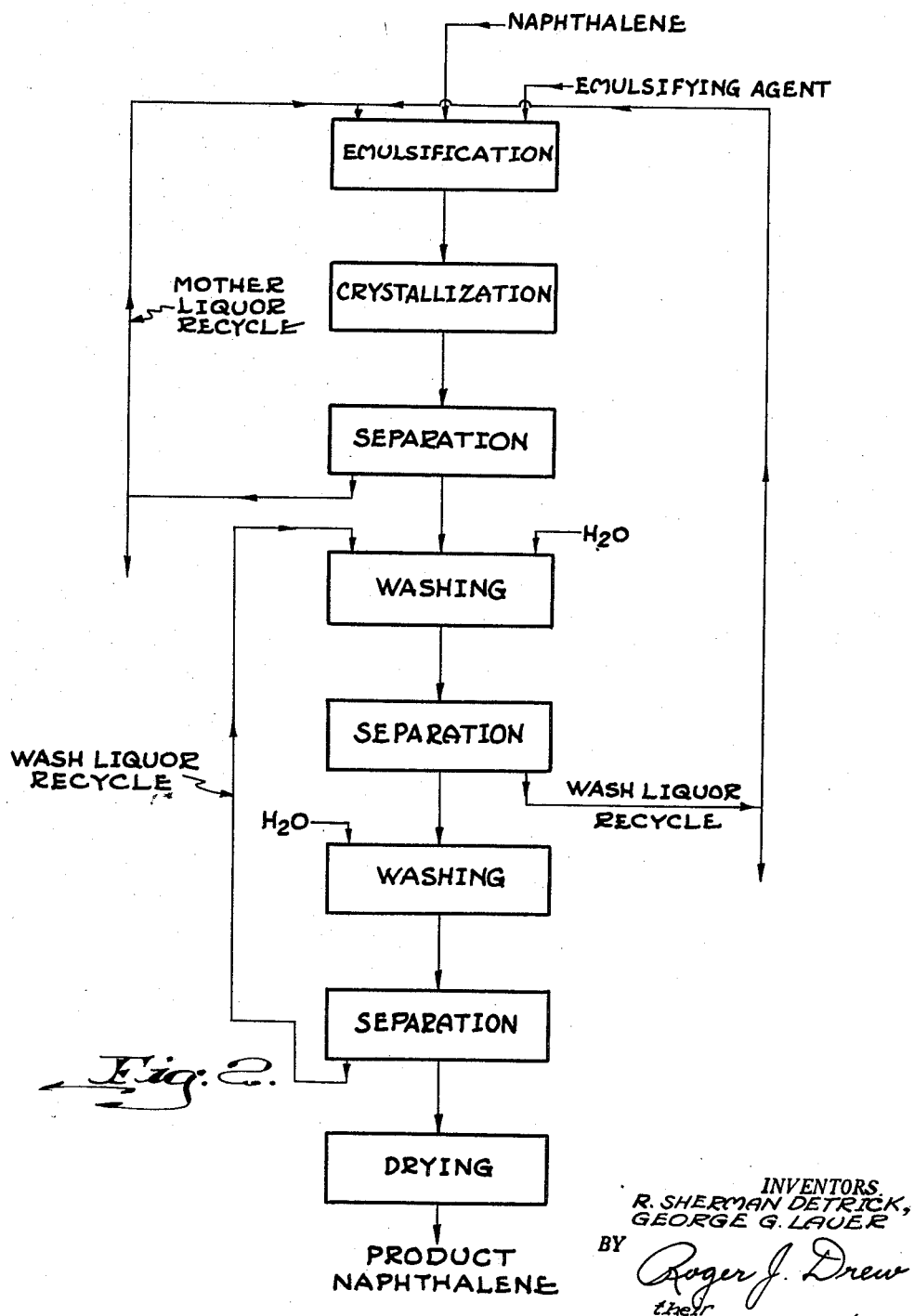

Referring specifically to the procedure outlined in Fig. 2, newly-incoming impure naphthalene is mixed at a temperature of at least about the freezing point of the newly-incoming impure napththalene and advantageously at about 85° C. in a portion of recycled impurities-containing mother liquor that has been recovered from previous treatment of impure napththalene and wash liquor recovered from a washing operation. Temperatures of emulsification as high as 100° C. give good results. This mother liquor contains constituents derived from impure napththalene as well as water and a small amount of an emulsifying agent such as, for example, sodium oleate or an alkyl-aryl sulfonate of the type utilized in many of the popular detergent compositions. A small amount of emulsifying agent, for example, about 0.25% by weight based on the weight of the naphthalene is advantageously added to the recycled mother liquor to provide for any loss of this material due to handling, etc. The finally-adjusted weight ratio of naphthalene to water is advantageously about 1:2, and the amount of emulsifying agent after final adjustment is advantageously about 2% by weight.

The temperature of the emulsion is then lowered or adjusted to crystallize out the naphthalene while the impurities, including the phenolic materials, remain dispersed in the mother liquor. The temperature at which the naphthalene will crystallize out will depend on the purity of the naphthalene with naphthalene of a higher degree of purity beginning to crystallize at a higher temperature than the more impure naphthalene. Good results have been obtained when the temperature of the emulsion is lowered to at least about 60° C. and excellent results obtained when the temperature has been lowered to from about 20° C. to about 40° C. This suspension of naphthalene crystals in mother liquor is then filtered to provide a crystalline naphthalene fraction and an impurities-containing mother liquor fraction which is disposed of. This withdrawn portion of mother liquor is advantageously a major portion of the total mother liquor produced but can be substantially more or less, if desired. The remaining mother liquor fraction is returned to the aforesaid emulsification step.

The amount of wash liquor recycled from the first washing operation to the emulsification step is advantageously adjusted in accordance with the amount of mother liquor withdrawn to maintain the proper weight balance in the system. In general, an amount of wash liquor is recycled from the first washing operation to emulsification that is advantageously about equal to the amount of mother liquor withdrawn. For example, if 300 parts by volume of mother liquor is withdrawn, about 300 parts by volume of wash liquor can be recycled to emulsification; when 250 parts by volume of mother liquor is withdrawn, about 250 parts by volume of wash liquor can be recycled to emulsification. The amount of emulsifying agent added in the emulsification step must also be adjusted in accordance with the amount of emulsifying agent in the withdrawn mother liquor to maintain the proper weight balance. The amount of water that can be added to the first washing operation and to the second washing operation, if desired, can obviously be adjusted in accordance with the amount of wash liquor that is to be recycled to the emulsification step.

The separated crystalline naphthalene fraction is then washed by the hereinbefore-described first washing operation with wash liquor recovered from a second washing operation, and thereafter filtered to provide a crystalline naphthalene fraction and an impurities-containing fraction of wash liquor. If desired, a small amount of fresh water can be added to this impurities-containing wash liquor utilized in the first washing operation to provide for any loss that may have occurred due to handling, etc. This impurities-containing fraction of wash liquor is recycled to the recycled mother liquor recovered from the naphthalene. The crystalline naphthalene fraction is then washed by the hereinbefore-described second washing operation, and the resultant slurry is thereafter filtered to provide a purified crystalline naphthalene and an impurities-containing fraction of wash liquor. The impurities-containing fraction of wash liquor is returned to the aforesaid first washing operation for utilization therein, and the washed, purified naphthalene is then dried by one of the hereinbefore-described drying methods.

The following specific example is illustrative of a typical procedure according to the process illustrated in the flow sheet of Fig. 2:

EXAMPLE IV

The emulsification, crystallization and separation steps of Example I are repeated utilizing 250 grams of liquid naphthalene having a freezing point of 74.6° C., 200 ml. of mother liquor containing the commercial detergent "Surf" from a fraction of mother liquor obtained from previous crystallizations of naphthalene (300 ml. of this mother liquor having first been withdrawn and discarded), 300 ml. of wash liquor recovered from a first washing operation and 1.75 grams of added "Surf." This emulsification is carried out at a temperature of about 78° C. and the emulsion is thereafter cooled to a temperature of 40° C. over a period of 142 minutes. Agitation during the emulsification and cooling steps is provided by means of a marine-type, three blade propeller. The filter cake is washed following the washing operation of Example II in 265 ml. of wash liquor recovered from a second washing operation and 35 ml. of tap water, and thereafter the slurry is filtered in a Buchner funnel provided with filter paper. This slurry washing and separation was carried out in a similar manner a second time in this first washing operation. The filter cake is repulped in 300 ml. of fresh water in a second washing operation, and the resultant slurry is filtered in the aforesaid Buchner funnel having filter paper as the filter medium. This slurry washing and separation is carried out a second time in a similar manner in this second washing operation. The wet naphthalene was then dried by being transferred to an Engler flask and distilled to a head temperature of 214° C.

The quantity of mother liquor obtained from previous crystallizations of naphthalene that is utilized in the emulsification step of foregoing Example IV can range, for example, from 150 ml. to 250 ml. If the major portion of mother liquor that is discarded is, for example, 350 ml., then the quantity utilized obviously is 150 ml.; if the major portion discarded is, for example 250 ml., then the quantity utilized is emulsification is 250 ml.

The foregoing procedure, which is referred to as the "first recycle" in the table of results hereinafter set forth, was repeated three times using a new batch of naphthalene each time, the three repeated runs being designated the second recycle, third recycle and fourth recycle in the table. The run designated the "initial run" in the following Table II of results represents a run in which 2% by weight of "Surf" based on the weight of the naphthalene was mixed with a 1:2 weight ratio of crude naphthalene and distilled water.

Data and properties of the products of the intial run and the four recycle runs are presented in the following Table II, percentages being given as percentages by weight:

Table II

|  | Fresh "Surf," Wt. Percent | Product, F. Pt., ° C. | Yield, Percent |
| --- | --- | --- | --- |
| Crude naphthalene |  | 74.6 |  |
| Initial Run | 2.0 | 79.2 | 92.6 |
| First Recycle | 0.7 | 79.0 | 92.5 |
| Second Recycle | 0.7 | 78.9 | 92.8 |
| Third Recycle | 0.7 | 79.0 | 93.9 |
| Fourth Recycle | 0.7 | 78.8 | 92.8 |

Any of the emulsifying agents disclosed can be employed in place of the "Surf" in an amount ranging broadly from about 0.30 to about 2.5% by weight and advantageously from about 1 to about 2% by weight.

Other surface active agents can be employed as emulsifying agents in the foregoing process and the foregoing modification thereof in place of the surface active agents disclosed. For example, the alkali metal salts of various alkyl-aryl sulfonic acids as well as the alkali metal salts of higher fatty acids having from 12 to 18 carbon atoms, viz., the sodium or potassium salts of linoleic, stearic, palmitic, myristic, oleic and linolenic. The sodium salts of oleic, linoleic and linolenic acid are particularly advantageous higher fatty acid salts for utilization in the foregoing process inasmuch as they result in a product naphthalene having a preferred high freezing point. Additionally the sodium salts of the commercial fatty acids sold under the trademarks "Neo-Fat S-142" (46% oleic, 39% linoleic, 3% linolenic, 12% rosin acids); "Neo-Fat D-142" (50% oleic, 40% linoleic, 4% linolenic, 6% rosin acids); "Emersol 201" (technical grade of oleic acid); and "Emery 500 Fatty Acid" (32-35° C. titer and 13% unsaponifiable) are desirable surface active agents for utilization as emulsifying agents. Examples of other surface active materials which are eminently adapted for utilization in the foregoing process and modification thereof (as exemplified by Figs. 1 and 2) are materials marketed under the trademarks "Nacconol NRSF" (sodium alkyl-aryl sulfonate the surface active constituent); "Antaron R-275" (sodium alkyl naphthalene sulfonate); "Aerosol OT" (di-octyl ester of sulfosuccinate); compounds of the general formula R—N(CH$_3$)$_3$Cl where R is a C$_{12}$ to C$_{18}$ carbon chain; "Rosinate No. 214" (potassium soap of rosin acids); "Dresinate 731" (sodium soap of rosin acids); stearamidopropyl-dimethyl-B-hydroxyethyl-ammonium chlorides, and "Armour Re-Nu" (70% potassium soap of rosin acids, 30% potassium soap of a mixture of 50% oleic and 50% linoleic acids). "Surf" contains 34.5% of sodium alkyl-aryl sulfonate and 54.0% of inorganic salts (including phosphate builders). A combination of an alkyl-aryl sulfonate with phosphate "builders" such as, for example, tetrasodium pyrophosphate and sodium tripolyphosphate has been found to be particularly advantageous for utilization as an emulsifying agent in the foregoing process and modified process inasmuch as it results in product naphthalene of a preferred high freezing point. "Builders" of the foregoing phosphate type are used extensively in commercial detergents such as, for example, "Surf." This combination of alkyl-aryl sulfonate and a "builder" can be employed in the foregoing process and modified process in an amount of advantageously about 1% by weight based on the weight of the crude naphthalene. The 1% charge contains about 0.33% of alkyl-aryl sulfonate and about 0.67% tetrasodium pyrophosphate or sodium tripolyphosphate builders. Other "builders" that could be utilized include, for example, sodium hexmetaphosphate, trisodium phosphate, etc.

Figure 3:
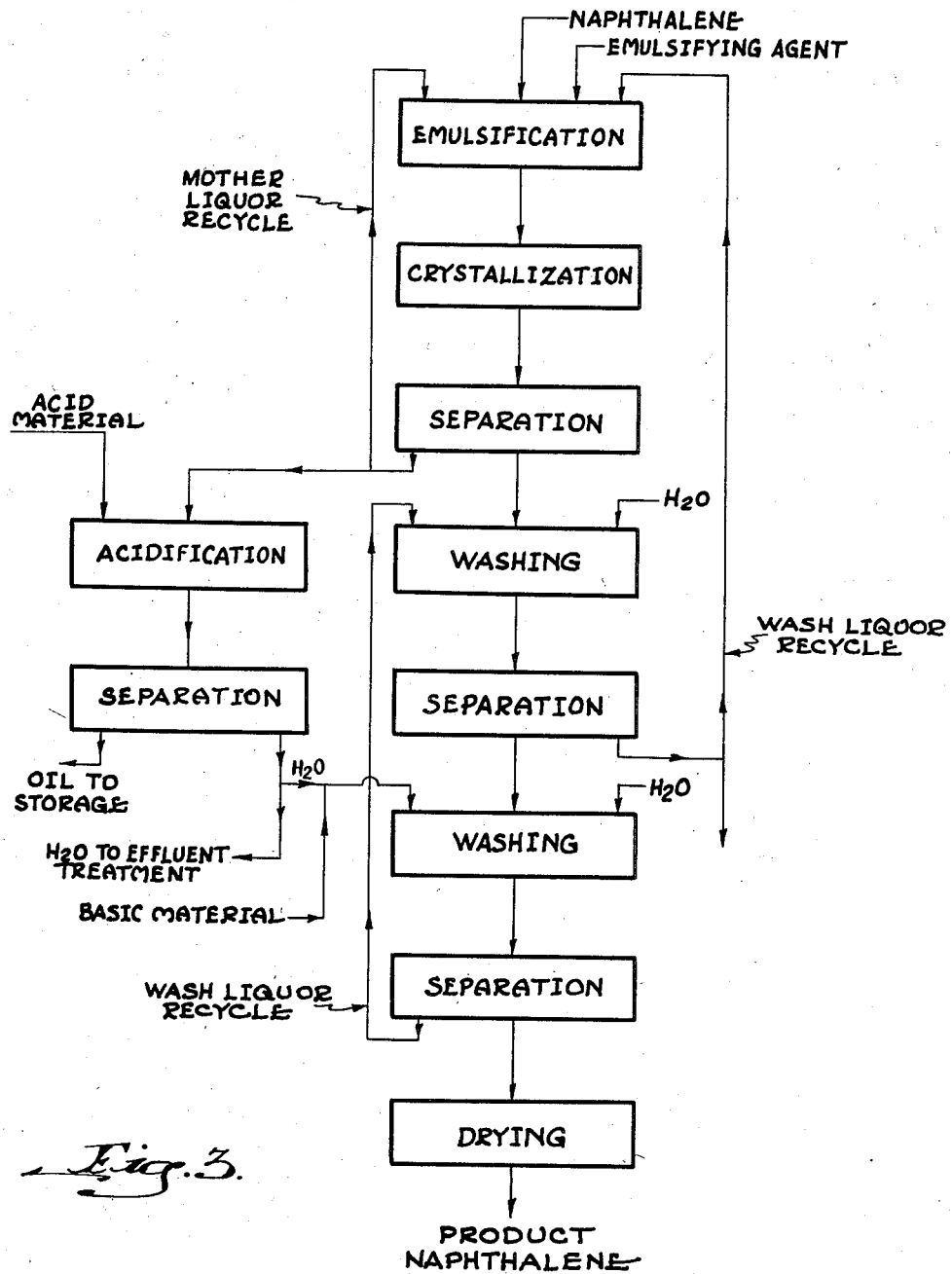

In the operation of the process illustrated in Fig. 3, crude naphthalene is mixed in impurities-containing mother liquor recovered from a previous treatment of impure naphthalene, recycled wash liquor that has been recovered from crystalline naphthalene that has been washed in a first washing operation, and advantageously a small amount of an emulsifying agent as is hereinbefore described, such as, for example, sodium oleate at a temperature of at least about the freezing point of the newly-incoming naphthalene and advantageously at about 85° C. Temperatures of emulsification as high as 100° C. produce good results. The mother liquor contains materials normally associated with crude naphthalene as well as water and a small amount of an emulsifying agent. The weight ratio of crude naphthalene to water is advantageously about 1:2. If desired, other emulsifying agents, such as, for example, the potassium salts of unsaturated fatty acids having 18 carbon atoms, sodium dodecylbenzene sulfonate, sodium alkyl napthalene sulfonates, and the emulsifying agents hereinbefore disclosed can be utilized in place of the sodium oleate. However, emulsifying agents that are combined with large quantities of complex phosphate builders are not preferred in this embodiment because these salts exert a strong buffering action, thus requiring relatively large amounts of acid material for breaking the emulsion.

The temperature of the emulsion is then lowered or adjusted to at least about 60° C. and advantageously to from about 20° C. to about 40° C. to crystallize the naphthalene, the impurities including phenolics remaining dispersed in the mother liquor. The temperature at which the naphthalene will crystallize out will depend on the purity of the naphthalene with naphthalene of a higher degree of purity beginning to crystallize at a higher temperature than the more impure naphthalene within the above range. The individual naphthalene crystals are then filtered from the mother liquor to provide a substantially purified crystalline fraction and an impurities-containing mother liquor fraction. This mother liquor fraction is then advantageously separated into at least two approximately equal portions, although one portion can be of substantially greater volume than the other portion(s) if desired. At least one portion of mother liquor is then returned to the emulsification step and at least one portion is passed to an acidification step where it is acidified with a suitable acid material, advantageously a mineral acid such as, for example, sulfuric acid, hydrochloric, nitric, phophoric, etc., to a pH lower than about 6 and advantageously to at least about 3, which breaks the emulsion to provide an aqueous phase and an oil phase. The aqueous phase is then separated from the oil phase by decantation or by any other suitable method to provide a fraction of a dilute aqueous salt solution containing phenolics and a fraction of oily impurities. The oil fraction is passed to storage and a minor portion of the aqueous fraction is advantageously withdrawn and passed to an effluent dephenolization treatment.

The remaining major portion of the aqueous fraction is neutralized with a suitable basic material such as, for example sodium hydroxide, potassium hydroxide, etc., and thereafter passed to a second washing operation. The crystalline naphthalene product is then advantageously washed by the herein before-described first washing operation with recycled impurities-containing wash liquor that has been recovered from crystalline naphthalene that has been washed in a second washing operation. If it is deemed necessary, a small amount of fresh water can be added to this impurities-containing wash liquor utilized in the first washing operation to provide for any handling losses, etc. The wash liquor is then separated from the naphthalene crystals either by centrifuging or filtering to provide a crystalline naphthalene fraction and a fraction of impurities-containing wash liquor. This washing and separating is advantageously carried out in a similar manner at least a second time in this first washing operation and the separated impurities-containing wash liquor is then recycled to the aforesaid step of emulsifying crude, impurities-containing naphthalene therein. A small portion of the impurities-containing wash liquor can be withdrawn prior to recycling, if desired. The crystalline naphthalene is then washed by the previously-described second washing operation with the neutralized impurities-containing aqueous fraction obtained by breaking the mother liquor emulsion by acidification. If it is believed necessary, a small amount of fresh water may be added to the wash liquor to provide for any handling loss. The wash liquor is then separated from the naphthalene crystals either by centrifuging or filtering to provide a fraction of crystalline naphthalene and a fraction of impurities-containing wash liquor. This washing and separating is advantageously carried out in a similar manner at least a second time in this second washing operation. The impurities-containing wash liquor is then recycled to the aforesaid first washing operation. The purified naphthalene can then be dried by any of the drying methods previously described.

The following specific example is illustrative of a typical procedure according to the process disclosed in the flow sheet of Fig. 3:

EXAMPLE V

The emulsification and crystallization steps of Example I are repeated utilizing 250 grams of liquid naphthalene having a freezing point of 74.6° C., 215 ml. of mother liquor containing sodium oleate from a fraction of mother liquor obtained from previous crystallizations of naphthalene—285 ml. of mother liquor having been withdrawn from this fraction for treatment in a later acidification step, and 285 ml. of wash liquor recovered from the first washing operation and 1.65 grams of added sodium oleate. This emulsification is carried out at a temperature of 92° C. and the emulsion is then cooled to a temperature of 30° C. over a period of 30 minutes. Mixing during emulsification and cooling is accomplished by means of a marine-type, two-blade propeller. The aforesaid 285 ml. portion of mother liquor that is withdrawn from the fraction of mother liquor is then transferred to a break kettle, heated to a temperature of 93° C. and acidified with a small amount of sulphuric acid to a pH of 3.9. This acidification breaks the emulsion to provide an oil phase and an aqueous phase which is separated from the oil phase for utilization in the second washing operation. The separated crystalline naphthalene filter cake is then washed in a first washing operation by repulping in 280 ml. of wash liquor recovered from a second washing operation made up to 300 ml. by adding 20 ml. of distilled water thereto and thereafter the resultant slurry is filtered in a Buchner funnel provided with filter paper as the filtering medium. This slurry washing and separation is carried out in a similar manner a second time. The crystalline naphthalene is then washed in a second washing operation by being repulped in 225 ml. of the neutralized aqueous fraction obtained by the aforementioned acidification of a portion of the mother liquor which is neutralized with sodium hydroxide and made up with 50 ml. of distilled water. This 225 ml. portion of the neutralized aqueous fraction represents a major portion of the acidified fraction of the dilute aqueous salt solution, 25 ml. of this fraction having been withdrawn and passed to an effluent dephenolization treatment. The resultant slurry is filtered by means of the previously described Buchner funnel which is provided with filter paper as the filtering medium. This slurry washing and separation is carried out in a substantially identical manner a second time, and 280 ml. of the separated impurities-containing wash liquor fraction is returned to the aforesaid first washing operation. The wet naphthalene is transferred to a flask and distilled to a head temperature of 214° C. to dry the naphthalene.

The quantity of wash liquor from the first washing operation that is recycled to the emulsification must be adjusted in accordance with the quantity of recycled mother liquor utilized in the emulsification step so as to maintain a proper weight balance in the system. Obviously the amount of water that can be added in the first washing operation and the second washing operation can be adjusted in accordance with the quantity of wash liquor that is to be returned to the emulsification step.

The foregoing procedure is designated the "first recycle" in the table of results which follows hereinafter and is repeated eleven times, the eleven repeated runs being referred to as the second recycle, third recycle, fourth recycle, fifth recycle, sixth, seventh, eighth, ninth, tenth, eleventh and twelfth recycle. The run referred to as the "initial run" in the following Table III of results represents a run in which 2% by weight of sodium oleate based on the weight of the crude naphthalene was mixed with a 1:2 weight ratio of crude naphthalene having a freezing point of 74.6° C. and distilled water.

Table III

|  | Fresh Sodium Oleate, Wt. Percent | Product, F. Pt., °C. | Yield, Percent |
|---|---|---|---|
| Starting Material |  | 74.6 |  |
| Initial Run | 2.0 | 79.2 | 94.1 |
| First Recycle | 0.6 | 79.0 | 92.6 |
| Second Recycle | 0.7 | 78.8 | 93.4 |
| Third Recycle | 0.7 | 78.7 | 94.4 |
| Fourth Recycle | 0.7 | 78.8 | 93.0 |
| Fifth Recycle | 0.7 | 78.6 | 93.6 |
| Sixth Recycle | 0.7 | 78.8 | 93.4 |
| Seventh Recycle | 0.7 | 78.6 | 93.8 |
| Eighth Recycle | 0.7 | 78.6 | 94.2 |
| Ninth Recycle | 0.7 | 78.3 | 94.3 |
| Tenth Recycle | 0.7 | 78.4 | 93.8 |
| Eleventh Recycle | 0.7 | 78.3 | 94.3 |
| Twelfth Recycle | 0.7 | 77.7 | 95.6 |

Any of the emulsifying agents disclosed can be utilized in place of the sodium oleate except emulsifying agents that are physically combined with phosphate builders which are not preferred in this embodiment of the invention.

Figure 4:
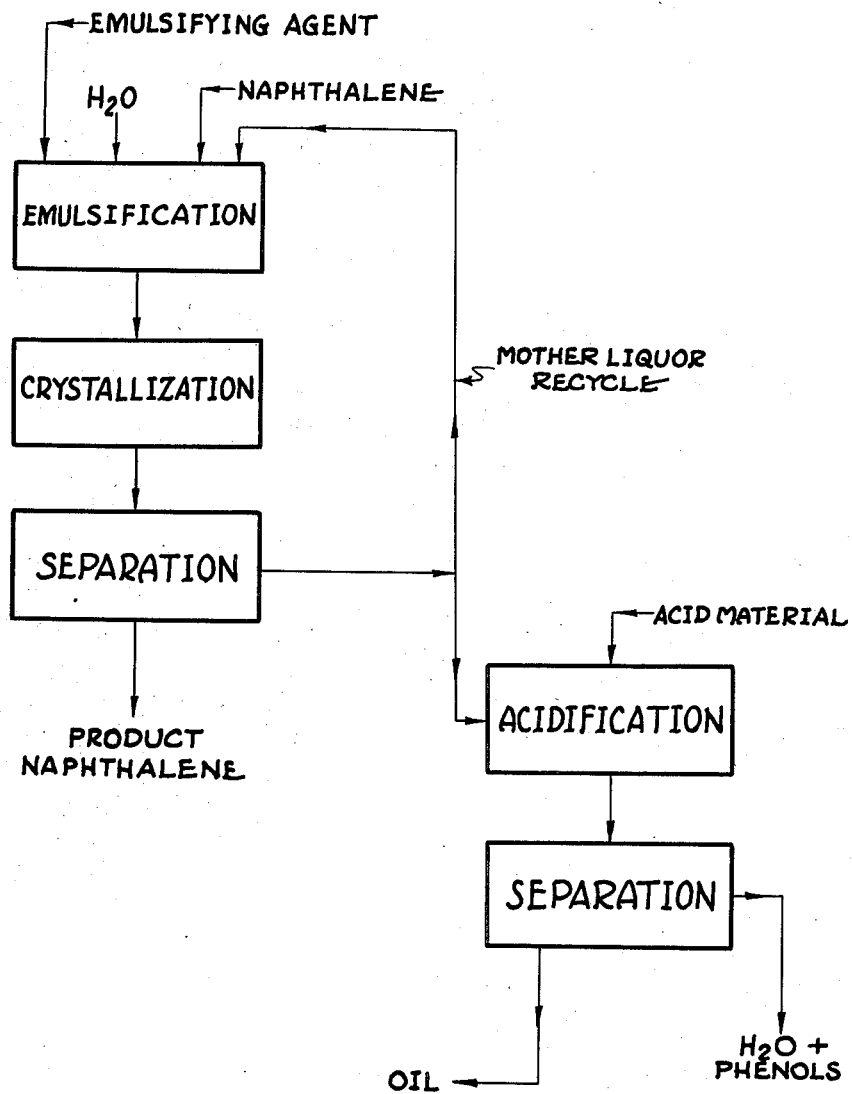

With reference now to the process exemplified by Fig. 4, crude naphthalene is mixed in recycled impurities-containing mother liquor which advantageously represents a major portion of mother liquor that has been recovered from previous treatment of impure naphthalene, advantageously a small amount of an emulsifying agent as is hereinbefore-described, such as, for example, sodium oleate and water at a temperature of at least about the freezing point of the newly-incoming naphthalene and advantageously at about 85° C. Temperatures of emulsification as high as 100° C. produce good results. The mother liquor contains constituents derived from impure naphthalene as well as water and a small amount of an emulsifying agent. Other emulsifying agents such as the emulsifying agents disclosed with regard to the operation of the process outlined in Fig. 3 can be utilized in place of the sodium oleate. Emulsifying agents that are combined with relatively large amounts of complex phosphate builders, however, are not preferred in this embodiment because these builders exert a strong buffering action therefore requiring relatively large amounts of acid material for breaking the emulsion. The temperature of the emulsion is then adjusted to from at least about 60° C. and advantageously from about 20° C. to about 40° C. to crystallize the naphthalene, the impurities including phenolics remaining dispersed in the mother liquor. The naphthalene crystals are then separated from the mother liquor advantageously by centrifuging although filtration could be employed to provide a substantially-purified crystalline fraction and an impurities-containing mother liquor fraction. The naphthalene crystals can then be washed, if desired, by either the hereinbefore-described single washing operation or the first and second washing operation, but washing is not essential where a small amount of an emulsifying agent or other material is not harmful to the product naphthalene. If washing is employed, the crystals are then advantageously dried, preferably by being melted and thereafter decanted following the decantation procedure hereinbefore-described.

The mother liquor fraction is then separated into a major portion and a minor portion—the major portion of the mother liquor being returned to the emulsification step and the minor portion having a small amount of an acid material added thereto, advantageously a mineral acid such as, for example, sulfuric, hydrochloric, nitric, phosphoric, etc. to adjust the pH lower than about 6 and advantageously to at least about 3 which breaks the emulsion to provide an aqueous phase and an oil phase. The aqueous phase is then separated from the oil phase by decantation or by any other suitable method to provide an aqueous fraction containing impurities including phenolics and an oil fraction. The aqueous fraction can then be passed to an effluent dephenolization treatment.

EXAMPLE VI

Five hundred pounds of liquid naphthalene having a freezing point of 74° C. is mixed with 502.9 pounds of mother liquor (having a composition of 390 pounds of water, 110 pounds of naphthalene and oil impurities and 2.9 pounds of sodium oleate) obtained from previous crystallizations of naphthalene, 210 pounds of zeolite-treated water and 1.4 pounds of added sodium oleate by being circulated at 85°–90° C. through a heat exchanger by means of a centrifugal pump. Cold water is then admitted to the annulus of the heat exchanger and the emulsion recirculated for 109 minutes until it reaches a temperature of 35° C. The naphthalene crystals are then separated from the mother liquor by means of a Baker-Perkins horizontal batch-type centrifuge equipped with a 200-mesh wire filter medium. Two hundred and forty pounds of mother liquor is then pumped to a break kettle where it is heated to 90° C. and acidified with sulfuric acid to a pH of 3. This acidification breaks the emulsion and the oil and water layers are separated by decantation as is previously described to provide 181 pounds of an aqueous fraction containing phenolics which is afterwards subjected to dephenolization, and 55 pounds of an oil fraction which is transferred to storage.

In foregoing Example VI, the amount of mother liquor that is withdrawn and acidified can vary advantageously from about 29% to about 35% by weight of the mother liquor separated from the naphthalene crystals, although substantially more or less mother liquor could be withdrawn and acidified if desired.

The foregoing procedure is designated the "first recycle" in the table of results which follows and is repeated seven times, the seven repeated runs being referred to as the second recycle, third recycle, fourth, fifth, sixth, seventh and eighth recycles. The run designated the "initial run" in the following table represents a run in which 0.7% by weight of sodium oleate based on the weight of the crude naphthalene is mixed with a 1:1 weight ratio of crude naphthalene having a freezing point of 74.0° C. and zeolite-treated water.

Table IV

|  | Fresh Sodium Oleate, Wt., Percent | Product, F. Pt., °C. | Yield, Percent |
|---|---|---|---|
| Starting Material |  | 74.3 |  |
| Initial Run | 0.7 | 78.8 | 91.3 |
| First Recycle | 0.08 | 78.3 | 94.5 |
| Second Recycle | 0.00 | 78.1 | 94.9 |
| Third Recycle | 0.48 | 78.3 | 93.2 |
| Fourth Recycle | 0.39 | 78.5 | 97.8 |
| Fifth Recycle | 0.33 | 78.1 | 89.7 |
| Sixth Recycle | 0.38 | 78.2 | 95.7 |
| Seventh Recycle | 0.34 | 78.2 | 94.3 |

Figure 5:
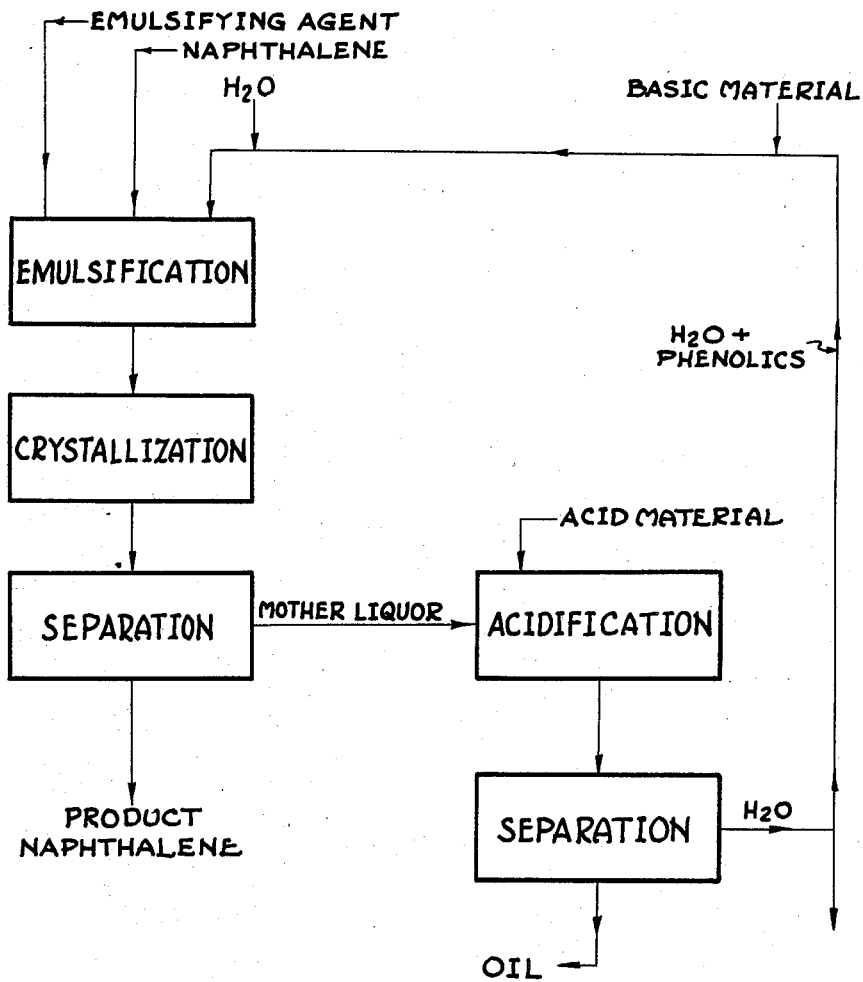

In the operation of the process disclosed in Fig. 5, crude naphthalene is mixed in advantageously the major portion of an aqueous fraction containing impurities including phenolics which is separated by acidification from impurities-containing mother liquor that has been recovered from previous treatment of impure naphthalene—this aqueous fraction having first been neutralized by the incorporation of a small amount of a basic material such as, for example, sodium hydroxide therein and also advantageously having fresh water added thereto, in the presence of advantageously a small amount of an emulsifying agent as is hereinbefore-described such as, for example, sodium oleate at a temperature of at least about the freezing point of the newly-incoming naphthalene and advantageously at about 85° C. Temperatures of emulsification as high as 100° C. give good results. The adjusted weight ratio of the impure naphthalene to water ranges advantageously from about 1:1 to about 1:2. Crystallization of the naphthalene and thereafter separation of the crystals from the mother liquor is carried out in a substantially identical procedure as is hereinbefore-described with regard to the process exemplified by the flow sheet of Fig. 4. The naphthalene crystals can then be washed, if desired, by either the hereinbefore-described sole washing operation or the first and second washing operation, and advantageously dried by decantation as is described with regard to the process illustrated by Fig. 4. The mother liquor is then acidified by the incorporation of a small amount of an acid material therein to a pH lower than about 6 and advantageously to at least about 3 as is described in the process outlined in Fig. 4 which breaks the emulsion, and thereafter the oil phase is separated from the aqueous phase also as is described in the process exemplified by Fig. 4. The oil fraction can be disposed of as desired. A minor portion of the aqueous fraction is advantageously withdrawn and passed to a dephenolization treatment. The major portion of the aqueous fraction is then neutralized by the incorporation of a small amount of a basic material such as, for example sodium hydroxide therein and this portion is recycled to the emulsification step.

The following specific example is illustrative of a typical procedure according to the process disclosed in the flow sheet of Fig. 5.

EXAMPLE VII

The emulsification, crystallization and separation steps of Example IV are repeated utilizing 600 pounds of liquid naphthalene having a freezing point of 74.1° C., 500 pounds of the neutralized aqueous fraction recovered from a mother liquor obtained from previous crystallizations of naphthalene by acidification, this aqueous fraction having had 0.4 pound of sodium hydroxide added thereto to neutralize it and 100 pounds of zeolite-treated water also added thereto; and 4.2 pounds of added sodium oleate. This emulsification is carried out at a temperature of 84° C. and the emulsion is cooled to a temperature of 33° C. over a period of 137 minutes by the emulsifying and cooling procedure of Example VI. 2.7 pounds of 25% sulfuric acid is added to the mother liquor to break the emulsion to provide an oil phase and an aqueous phase. The oil fraction amounted to 66 pounds and is passed to storage. Seventy pounds of the aqueous fraction which totaled 570 pounds was transferred to the dephenolization treatment. The remaining 500 pounds had 0.4 pound of sodium hydroxide added thereto and 100 pounds of zeolite-treated water added thereto so as to render this aqueous fraction suitable for the emulsification of a new charge of naphthalene.

The foregoing procedure of Example VII is designated the "first recycle" in the table of results which follows and is repeated nine times, the nine repeated runs being referred to as the second recycle, third recycle, fourth, fifth, sixth, seventh, eighth, ninth and tenth recycles. The run termed the "initial run" in the following table represents a run in which 0.7% by weight of sodium oleate based on the weight of the crude naphthalene is mixed with a 1:1 weight ratio of crude naphthalene having a freezing point of 74.5° C. and zeolite-treated water.

Table V

|  | Fresh Sodium Oleate, Wt. Percent | Product, F. Pt., ° C. | Yield, Percent |
| --- | --- | --- | --- |
| Starting material |  | 74.5 |  |
| Initial Run | 0.7 | 78.8 | 94.2 |
| First Recycle | 0.7 | 78.8 | 92.8 |
| Second Recycle | 0.7 | 78.7 | 89.9 |
| Third Recycle | 0.7 | 78.7 | 92.5 |
| Fourth Recycle | 0.7 | 78.7 | 96.1 |
| Fifth Recycle | 0.7 | 78.8 | 95.8 |
| Sixth Recycle | 0.7 | 78.4 | 94.3 |
| Seventh Recycle | 0.7 | 78.0 | 93.3 |
| Eighth Recycle | 0.7 | 78.5 | 95.2 |
| Ninth Recycle | 0.7 | 78.4 | 93.4 |
| Tenth Recycle | 0.7 | 78.7 | 93.9 |

Different grades of naphthalene can be treated in accordance with the processes of this invention. For example, impure naphthalenes having freezing points as low as 51° C. and lower can be treated.

In the foregoing process and modifications thereof, the particle size of the crude naphthalene when emulsified is advantageously of about 3 microns or less and uniform in size. It has been found that non-uniform particles larger than 3 microns result in a product naphthalene having a lower freezing point.

The naphthalene that is purified in accordance with the instant invention may be derived from water-gas tar, coke-oven tar, special synthesis, drip oils, etc. This invention is applicable to impure naphthalene derived from any of these sources.

What is claimed is:

1. A naphthalene purification process using a minimum amount of water comprising the steps of forming an emulsion of impure liquid naphthalene with an aqueous mother liquor at a temperature of about the freezing point of naphthalene, said mother liquor containing naphthalene along with the impurities normally associated with impure naphthalene and a small amount of an emulsifying agent of the group consisting of anionic and cationic surface active agents, slowly lowering the temperature of the emulsion to crystallize naphthalene from the emulsion, separating the crystals of naphthalene from the mother liquor, whereby the impurities remain in the mother liquor and the crystals are naphthalene of substantially improved purity, and recycling at least part of said mother liquor without further treatment as said first named mother liquor for the emulsification of additional impure naphthalene for the purification thereof.

2. The process of claim 1 wherein the emulsifying agent present in the mother liquor is an alkali metal salt of an alkyl-aryl sulfonate.

3. The process according to claim 1 wherein the emulsifying agent present in the mother liquor is the alkali metal salt of a higher fatty acid.

4. The process according to claim 1 wherein the emulsifying agent present in the mother liquor is R—N(CH$_3$)$_3$Cl where R is a C$_{12}$ to C$_{18}$ carbon chain.

5. The process of claim 1 wherein the emulsifying agent present in the mother liquor is the di-octyl ester of sulfosuccinate.

6. The process according to claim 1 wherein the emulsifying agent present in the mother liquor is sodium lauryl sulfate.

7. A process of purifying naphthalene comprising: emulsifying impure, liquid naphthalene at a temperature of at least about its freezing point in recycled mother liquor containing naphthalene, water, a small amount of emulsifying agent of the group consisting of anionic and cationic surface active agents, and impurities normally associated with impure naphthalene recovered from a previous emulsification of impure naphthalene in water and crystallization of naphthalene therefrom in the presence of a small amount of added aforesaid emulsifying agent; lowering the temperature of the emulsion gradually to a temperature at which naphthalene will crystallize; centrifuging the product to separate crystalline naphthalene from an impurities-containing mother liquor; withdrawing a minor portion of said mother liquor; and thereafter recycling the remaining impurities-containing mother liquor to the aforesaid step of emulsifying impure naphthalene therein.

8. A process comprising: emulsifying impure, liquid naphthalene at a temperature of at least about its freezing point in recycled mother liquor containing naphthalene, water, a small amount of emulsifying agent of the group consisting of anionic and cationic surface active agents, and impurities normally associated with impure naphthalene recovered from a previous emulsification of impure naphthalene in water and crystallization of naphthalene therefrom and wash liquor recovered from a naphthalene washing operation; lowering the temperature of the emulsion gradually to crystallize naphthalene; separating crystalline naphthalene from said impurities-containing mother liquor; withdrawing a portion of said mother liquor; adding an emulsifying agent and water to the remaining mother liquor in an amount sufficient to make up for the emulsifying agent and water lost by mechanical losses and in the portion of mother liquor withdrawn; and thereafter recycling said remaining impurities-containing mother liquor to the aforesaid step of emulsifying newly-incoming impure naphthalene therein.

9. The process according to claim 8 wherein the emulsifying agent is an alkyl-aryl sulfonate.

10. The process according to claim 8 wherein the emulsifying agent is the alkali metal salt of a higher fatty acid.

11. The process of claim 8 wherein the emulsifying agent is R—N(CH$_3$)$_3$Cl where R is a C$_{12}$ to C$_{18}$ carbon chain.

12. The process of claim 8 wherein the emulsifying agent is the di-octyl ester of sulfosuccinate.

13. The process according to claim 8 wherein the emulsifying agent is sodium lauryl sulfate.

14. A process for the purification of naphthalene comprising: emulsifying impure liquid naphthalene at a temperature of at least approximately its freezing point in recycled mother liquor containing naphthalene, water, a small amount of emulsifying agent of the group consisting of anionic and cationic surface active agents, and impurities normally associated with impure naphthalene recovered from a previous emulsification of impure naphthalene in water and crystallization of naphthalene therefrom and recycled wash liquor recovered from a first naphthalene washing operation; lowering the temperature of the emulsion gradually to crystallize naphthalene; separating crystalline naphthalene from an impurities-containing mother liquor; separating said mother liquor into at least two portions; recycling at least one portion of said mother liquor to the emulsification step; said recycled mother liquor having added thereto aforesaid emulsifying agent and water in an amount sufficient to make up for the emulsifying agent and water lost by mechanical losses and in the portion of mother liquor separated therefrom; acidifying at least one portion of the separated mother liquor with acid material to break the emulsion to provide an aqueous phase and an oil phase; separating the aqueous phase from the oil phase to provide an aqueous fraction and an oil fraction; neutralizing said aqueous fraction with a basic material; passing the neutralized aqueous fraction to a second naphthalene washing operation; washing the separated crystalline naphthalene in a first washing operation with recycled naphthalene wash liquor that has been recovered from crystalline naphthalene that has been washed in a second naphthalene washing operation; separating crystalline naphthalene from the wash liquor; washing said crystalline naphthalene in a second washing operation with said neutralized aqueous fraction; separating said crystalline naphthalene from said naphthalene wash liquor; and thereafter recycling said naphthalene wash liquor fraction to the aforesaid first washing operation.

15. The process according to claim 14 wherein the emulsifying agent is the alkali metal salt of a higher fatty acid.

16. The process according to claim 14 wherein the emulsifying agent is an alkali metal salt of an alkyl-aryl sulfonate.

17. The process according to claim 14 wherein the emulsifying agent is the di-octyl ester of sulfosuccinate.

18. The process of claim 14 wherein the emulsifying agent is sodium lauryl sulfate.

19. The process according to claim 14 wherein the emulsifying agent is R—N(CH$_3$)$_3$Cl where R is a C$_{12}$ to C$_{18}$ chain.

20. A process for the purification of naphthalene comprising: emulsifying impure liquid naphthalene at a temperature of at least about its freezing point in recycled mother liquor containing naphthalene, water, a small amount of emulsifying agent of the group consisting of anionic and cationic surface active agents, and impurities normally associated with impure naphthalene representing a major portion of mother liquor that has been recovered from previous emulsification of impure naphthalene in water and crystallization of naphthalene therefrom in the presence of small amounts of added water and aforesaid emulsifying agent; lowering the temperature of the emulsion to crystallize naphthalene; separating crystalline naphthalene from an impurities-containing mother liquor; separating said mother liquor into a major portion and a minor portion; recycling said major portion to the emulsification step; acidifying said minor portion of mother liquor with an acid material which breaks the emulsion to provide an aqueous phase and an oil phase; and thereafter separating said aqueous phase from said oil phase to provide an aqueous fraction containing phenols and an oil fraction.

21. The process according to claim 20 wherein the emulsifying agent is an alkali metal salt of a higher fatty acid.

22. The process according to claim 20 wherein the emulsifying agent is an alkali-metal salt of an alkyl-aryl sulfonate.

23. The process according to claim 20 wherein the emulsifying agent is the di-octyl ester of sulfosuccinate.

24. The process according to claim 20 wherein the emulsifying agent is sodium lauryl sulfate.

25. A process according to claim 20 wherein the emulsifying agent is R—N(CH$_3$)$_3$Cl where R is a C$_{12}$ to C$_{18}$ carbon chain.

References Cited in the file of this patent

UNITED STATES PATENTS

| Number | Name | Date |
|---|---|---|
| 1,199,861 | Barstow et al. | Oct. 3, 1916 |
| 2,078,963 | Miller | May 4, 1937 |
| 2,296,459 | Schutte | Sept. 22, 1942 |
| 2,493,781 | Schneider et al. | Jan. 10, 1950 |
| 2,511,711 | Hetzner et al. | June 13, 1950 |
| 2,678,955 | Ogilvie | May 18, 1954 |
| 2,704,779 | Apgar | Mar. 22, 1955 |
| 2,711,432 | Krzesz | June 21, 1955 |

FOREIGN PATENTS

| 48,714 | Sweden | Jan. 5, 1920 |